United States Patent [19]

Christiansen et al.

[11] Patent Number: 4,499,109

[45] Date of Patent: Feb. 12, 1985

[54] PROCESS FOR THE PRODUCTION OF CHEESE CURD

[75] Inventors: Tage Christiansen, Nibe; Werner Imhof, Vadum; Poul F. Jensen, Aalborg; Jens B. Kjaer, Hjallerup; Bjarne Kristiansen, Nibe; Kjeld Kristensen, Vodskov; Bent Pedersen, Hjallerup, all of Denmark

[73] Assignee: Orum Sogns Mejeri APS, Hjallerup, Denmark

[21] Appl. No.: 379,092

[22] Filed: May 17, 1982

[30] Foreign Application Priority Data

May 15, 1981 [SE] Sweden ................. 8103062

[51] Int. Cl.$^3$ .................. A23C 9/12; A23C 19/00
[52] U.S. Cl. ...................... 426/36; 426/582
[58] Field of Search ............ 426/34, 40, 36, 35, 426/39, 38, 42, 276, 491, 516, 582; 435/287, 288, 290, 289, 316; 99/452, 453, 455, 466

[56] References Cited

U.S. PATENT DOCUMENTS

| 2,781,269 | 2/1957 | Harper et al. | 426/36 |
| 2,908,575 | 10/1959 | Spiess et al. | 426/36 |
| 3,899,595 | 8/1975 | Stenne | 426/36 |
| 3,985,622 | 10/1976 | Hawkins | 435/289 |
| 4,131,688 | 12/1978 | Grosclaude et al. | 426/491 |

FOREIGN PATENT DOCUMENTS 1206011 1/1968 United Kingdom ............ 99/452

Primary Examiner—Robert Yoncoskie
Assistant Examiner—Marianne S. Minnick
Attorney, Agent, or Firm—Cyrus S. Hapgood

[57] ABSTRACT

Cheese curd is produced by coagulating a milk product during its passage through a long coagulator tube under renneting conditions giving a relatively slow coagulation course. The milk product is renneted in-line and the renneted mixture is fed periodically to the inlet end of the coagulator tube during feeding periods with intermediate stand still periods, the length of a feeding period being selected so that no essential coagulation occurs in the mixture from its introduction into the coagulator tube up to the successive stand still period, and the length of a stand still period being selected so that the mixture after having been subjected to one stand still period in the coagulator tube forms a sufficiently firm coagulum to be transported by feeding new mixture during the successive feeding period towards the outlet end of the coagulator tube as a continuous plug. The speed of feeding mixture into the coagulator tube and the length of the coagulator tube are adjusted so that the residence time in the coagulator tube comprises at least one feeding period and one stand still period.

11 Claims, No Drawings

PROCESS FOR THE PRODUCTION OF CHEESE CURD

The invention relates to a process and an apparatus for the production of cheese curd from a liquid milk product. More specifically, the invention relates to a new method of coagulating the milk product while being transported through a tubular coagulator after initiation of the so called renneting procedure.

During the recent years an extensive development has been going on to further mechanize the cheese manufacturing in the direction towards whole continuous processes. New possibilities to produce suitable protein enriched milk products and especially a rapid development within the field of ultra filtration has greatly contributed to replace the traditional coagulation procedure in batch by quite a number of more or less whole continuous coagulation processes including the production of finished cheese direct from the coagulator as well as the production of cheese curd, which after cutting and draining is reintegrated to cheeses of desired shape.

As an attempt to roughly classify the recent methods to improve the adaption of the coagulation step at cheese manufacturing in the direction towards whole continuous processes, it can be noted that on one hand it has been worked at achieving continuous flow through tubular coagulators and on the other hand so called multi-tube processes have been developed, the working priciple of which is to fill a large number of parallel, relatively short tube elements, allow the coagulation to occur in quiescent state and press out the cheese curd, whereafter the tubes are refilled.

The physical-chemical characteristics of the milk product being fed to a coagulator naturally effect on the coagulation process. As to the components of the milk product, roughly being coaguable protein (casein), soluble protein, fat and lactose, the fat content seems to have minor effect on the coagulation course, and in the following it is preferably referred to fat free dry substance. The dry substance content significantly effect on the characteristics of the formed coagulum and is in particular critical to the matter whether the coagulum can be cut and reintegrated. For direct production of finished cheese from a coagulator tube there is in general required at least about 20% fat-free DS, whereas the upper limit for obtaining a reintegrateable cheese coagulum is in the range of about 14–17%.

The start product at modern continuous or semi-continuous coagulation methods is usually not milk or skimmed milk as at traditional cheese making, but a milk product with increased casein content. The method of achieving such concentrate does not seem to have any crucial effect on the coagulation course. The experiments made in context with the elaboration of the present invention are based on concentration by ultra filtration, but other concentration methods can also be used. In comparison with concentrate obtained by evaporation, a UF retentate generally differs in that its lactose concentration and salt concentration remain at about the same level as the corresponding concentrations in the original milk.

Important parameters for the coagulation in coagulator tubes are above all the so called renneting conditions. The term "renneting" is here used to include coagulation by means of rennet or by means of other enzymatic systems, acid coagulation by acid fermentation or addition of acid and combinations thereof. The renneting time, that is the period of time between the initiation of the coagulation and the occurance of the first sign of flocculation, can be regarded as a resulting parameter from the renneting conditions, and consequently a division of the different known coagulation methods in terms of long renneting time and short renneting time can be of help. The most important renneting parameters are: Rennet concentration, temperature, pH and salt concentration. Thus, the renneting time can for example be reduced by increased temperature, increased amount of rennet, reduced pH through the addition of fermentation culture or addition of acid. One special method of accelerating the renneting course is so called cold-renneting, whereat rennet is admixed to the milk product at such a low temperature that the coagulation does not start at this temperature but proceeds very rapidly when the temperature is raised.

A general philosophy at several suggested processes for the adaption of cheese coagulating to continuous processes is the use of such renneting conditions that provide rapid coagulation. This is far from surprising since a natural approach at exploiting the multi-tube principle as well as whole continuous coagulation in tubes of limited length would be that short residence time is prerequisite to achieve reasonable production capacity and process economy.

One example of such a "fast renneting" process is given in the German patent application No. 1582979 (Schulz), according to which the milk is first accidified and then brought to coagulation through heating during continuous flow through thin tubes (5–40 mm). The narrow section of the tubes is probably prerequisite to achieve tolerably uniform heating of the cheese curd. Schulz has also suggested a multi-tube process (Milchwissenschaft 24, 1969) at which each tube is filled with preacidified milk which is coagulated in quiescent state during a few minutes, whereafter the tubes are refilled during simultaneous discharge of finished cheese curd.

The German patent application No. 1792264 (Roiner) describes another fast-renneting method in context with continuous coagulation. To avoid the difficulties at a cold-renneting process to rapidly and uniformly heat the cheese mass to the intended renneting temperature, there is suggested heavy acidification at the renneting temperature before the addition of rennet, after which the coagulation occurs within a period of seconds or some minute during continuous flow through a coagulator tube.

The suggested rapid coagulation processes have not resulted in satisfying industrial applications, and probable reasons therefore are i.a. varying cheese quality due to difficulties to achieve precise and uniform control of the coagulation and problems caused by precoagulation in the equipment for dosing and heat control.

A multi-tube process, at which relatively slow coagulation is carried out by the addition of rennet and starter culture just before feeding the mass into the coagulator, is described in the U.S. Pat. No. 3,899,586 (Stenne). A large number of vertical short tubes are filled during a filling period, whereafter the coagulation occurs in stationary state, and during a discharge period the curd is pressed out by means of pistons in upward movement. The decisive drawback of this and other multi-tube methods is the complicated machinery for feeding milk product into and discharging and cutting cheese curd from the large number of coagulator tubes required to reach a reasonable plant capacity. Also the control equipment for coordinating the performance of all these tubes will be complicated. An example of the complexity of such multi-tube plants is given in the French patent application No. 2 340 041 stating the same inventor as the above said U.S. patent. 30-40 different tubes are mounted like spokes in a wheel-like, rotatable device, and through rotating this device the tubes are successively brought to pass filling and discharge stations.

It is obvious that the dreamed end for the art people within the field of continuous cheese coagulation is to succeed in pumping the start product under coagulation through one single tube or a small number of coagulator tubes at a capacity acceptable for industrial use.

The U.S. Pat. No. 4,131,688 describes a continuous process for cheese coagulation, whereat a relatively slow renneting course is used. To avoid the disruption of formed coagulum through turbulence, a laminar flow through cylinders of the length of about 3 m are prescribed. Besides, special inlet means to effect on the flow pattern in the cylinders are used. Even if thereby continuous flow is achieved, this is obtained to the price of very slow flow and low capacity per cylinder. The figure 30 l/h is stated, and in such a case a commercial plant of for example 6000 l/h concentrate would require 200 such cylinders. Thus, there is hardly anything won as to reduced complexity compared with the above said multi-tube plants.

A very special continuous coagulation method is described in the Brittish patent specification No. 1,410,289 (Stenne). UF-retentate is continuously pumped through a long (20 m) coagulator tube (d=100 mm). To avoid the adherence of coagulated cheese curd along the tube walls, the walls of the coagulator must be flexible so as to be deformed by means of a pulsation effect imposed to the rentetate pumped into the tube. The need for such wall deformations indicates that continuous coagulation in tubes with stiff walls results in that the formed coagulum is broken by cheese curd adhering on the tube walls. Further, also this process seems to be restricted in that the flow velocity can not be decreased over a certain limit due to the risk of coagulum disruption through turbulence. The examples indicate that the velocity through the coagulator is in the range of 1-2 m/min.

The object of the present invention is to achieve a cheese coagulation process, which by means of simple equipment makes possible production capacities of industrial scale and which is well adapted for integration in a continuous cheese manufacturing process.

This object has been reached through a coagulation process, at which the milk product is coagulated during its passage through one or a small number of long coagulator tubes under renneting conditions that provide a coagulation course of moderate or relatively low speed, and which process is mainly characterized in that the start mixture is intermittently fed to the inlet end of the coagulator tube during feeding periods with intermediate stand still periods, the length of a feeding period being selected so that no essential coagulation occurs in the mixture from its introduction into the coagulator tube up to the successive stand still period, and the length of a stand still period being selected so that the mixture after having been subjected to one stand still period in the coagulator tube forms a sufficiently firm coagulum to be transported during a successive feeding period towards the outlet end of the coagulator tube as a continuous plug, and that the speed of introducing mixture into the coagulator tube and the length of the coagulator tube are adjusted so that the residence time in the coagulator tube for the cheese curd discharged through the outlet end of said tube comprises at least one feeding period and one stand still period.

According to the invention it has been surprisingly found, that cheese coagulum can be transported through a long coagulator tube with smooth static walls without coagulum disruption by selecting such renneting conditions so that no substantial coagulation occurs during the period when milk product is fed through the inlet of the coagulator and by dimensioning the successive stand still period so that all mass downstreams the uncoagulated mass is carried on as a continuous coagulum plug. The process according to the invention can also be regarded as a combination of the principle of coagulation in a long coagulator tube, whereat continuous flow under relatively slow coagulation has been regarded as the natural way of operation, and the multitube principle with coagulation under quiescent state, whereat preferably rapid coagulation methods have been used. By this combination several surprising results and possibilities have been achieved: Beside the fact that an acceptable solution has been given to the problem of curd adhersion to statical tube walls, the object of providing high flow through a small number of coagulator tubes has been reached. Thus, the periodical feeding according to the invention enables the use of surprisingly high feed rate without the occurrence of coagulum disruption, and flow speeds in the range of 4-20 m/min. have proved to be quite realistic. Since this speed by several times exceeds the flow speeds that are possible without coagulum disruption at permanent flow, stand still periods do not cause any loss in capacity when compared with a corresponding coagular tube working according to the principle of permanent feeding, and a capacity increase is rather obtained. As an example of said capacity it may be noted, that when cheese curd is produced in the coagulator tube stated in the example mentioned below and for example stand still periods of twice the length of the feeding periods are selected, which means that three parallel coagulator tubes are required for continuous production, a capacity of 4,000 lit. cheese curd per hour is obtained.

As mentioned above, the composition of the milk product to be coagulated can be obtained in different ways. Preferably milk with raised protein concentration is used to reduce the amount of whey that has to be drained in case a cheese curd for cutting and reintegration is concerned, or a milk product with a composition corresponding to the one of finished cheese in case finished pieces of cheese are to be cut directly from the coagulator. By modern ultra filtration technique the milk can be concentrated with as well as without its fat content. In the latter case fat—for example in the form of cream—can be added after the ultra filtration. In order to reduce the fat losses in context with the draining procedure, the UF retentate or—in case the fat is added after the ultra filtration—the added fat alone should be subjected to homogenization.

Since the process according to the invention is based on coagulation in a small number of long coagulated tubes and relatively slow renneting, the renneting condition must be selected not only with respect to the desired cheese characteristics but also so that a sufficient part of the renneting time remains after introduction of the mass into the coagulator tube. Therefore this remaining part of the renneting time should be at least 3 min. for a commercial utilization of the invention, and a total renneting time in the range of 5-20 min. is suitable. According to a preferred embodiment of the invention the starting milk product is first brought to renneting temperature, which is in the range of 25°-50° C. in case rennet is used as the main coagulation agent, whereafter rennet and possibly fermentation culture are added in-line immediately before feeding into the coagulator. However, a certain preacidification is compatible with the process according to the invention, and can for example be carried out in a storage tank, from which the milk is pumped to the coagulator under rennet addition and possible control of the renneting temperature. The dosing of rennet and possible starter culture is suitably carried out in-line by means of dosing pumps which are synchronized with the feed pump for feeding the milk mass into the coagulator tube. Such equipment is well known to those skilled in the art.

From the combination slow coagulation—simple coagulator unit comprising only a few coagulator tubes follows, that each coagulator tube must contain a considerable volume of cheese curd in order to reach a high plant capacity. Since according to the process of the invention a tube diameter in the range of 5-15 cm has proved to be feasible, very long tubes are required, and this criterium has surprisingly also proved to be compatible with the process characteristics stated in the patent claims enclosed. According to the invention the length/diameter ratio of the coagulator tube shall be in excess of 500:1, preferably in excess of 1000:1. To provide a compact coagulator unit, the coagulator tube is suitably spiral wound with uniform curvature, the radius of curvature, however, must be selected large enough to provide only a moderate increase of the flow resistance. The spiral form also facilitates the temperature control of the coagulator tube. At the process according to the invention a constant temperature in the milk mass is preferably maintained, especially during the renneting time, but also during the further transport of the coagulum through the coagulator tube. For practical use a sufficient temperature control can be obtained by arranging an isolated envelope around the tube spiral.

The length of the feeding periods and the stand still periods can be varied within relatively wide limits. For optimal utilization of the invention the available renneting time should however, be utilized for the addition of new milk product to the coagulator, and the feeding period is preferably within the range of 0.5-1.2 of the renneting time. The stand still periods must according to the invention be sufficiently long to allow the transformation of the new fed milk product into a coagulum with sufficient cohesive strength, and therefore the total length of a feeding period and a stand still period must be at least 1.5 of the renneting time, preferably 2-4 times the renneting time. The length of the coagulator tube and the feeding rate is adjusted so that the total residence time of the mixture in the coagulator tube forms an integer multiple of the feeding period. The mutual ratio between the length of a feeding period and a stand still period gives directly the minimum number of coagulator tubes required for continuous production of cheese curd. Mathematically the number of simultaneously operated coagulator tubes in a coagulator unit is $n (1+S/T)$, wherein n is the number of simultaneously fed coagulator tubes, S the length of the stand still period and T the length of the feeding period.

The number of feeding periods and stand still periods to which the curd is subjected before being discharged from the coagulator tube must be at least one stand still period and one feeding period, but preferably several such periods are used since it has been experienced that long residence times in the coagulator often improve the characteristics of the discharged coagulum with respect to cutting etc. A prolongation of the residence time neither requires an increase in the number of coagulator tubes, provided that a required corresponding increase of the tube length is not limited by for example a too large pumping resistance. The capital cost for additional length of tube must be considered low in comparison with installation of further parallel lines including separate equipment for dosing, feeding and cutting etc.

The further treatment of the cheese curd after it is discharged as a plug from one or several coagulator tubes does not fall within the scope of the present invention. Different methods to cut the cheese curd by means of cutting devices directly applied to the outlet of the coagulator to cut the cheese curd into cheese fragments as well as finished pieces of cheese are known. It is however obvious, that the present process, which permits continuous discharge of cheese curd to high capacity from a small number of coagulator tubes, is extremely feasible for integration in a whole continuous cheese process for the production of various cheese products.

EXAMPLE 64.000 l milk containing 2.95% fat was pasteurized at 80° C. during 15 sec. and cooled to 50° C. The product was ultra filtrated to a dry substance concentration (TS) of 27%. The concentrate was heated at 78° C. during 30 sec., homogenized at 75 bar and 56° C. and conveyed under cooling to a mixing tank. To the tank was also added complementory colour and 0.006% lamb lipas (Chr. Hansen). From the mixing tank 4.100 l/h concentrate was pumped under in-line mixing with 1.5% starter culture of single strain type followed by also in-line mixing of rennet solution of the strength 1:100 in an amount of 7% with respect to concentrate, whereafter the renneted concentrate of 33° C. was fed directly into a coagulator tube.

The coagulator tube was made in stain-less steel having a diameter of 78 mm and a length of 350 m and was designed as a spiral with a diameter of about 3 m. The tube spiral was built into a heat isolated envelope. The milk was pumped into the coagulator during 12 minutes and was kept in quiescent state during 18 minutes before new milk was pumped again during 12 minutes etc. The total residence time in the coagulator was 60 minutes, thus comprising two feeding periods and two stand still periods.

The continuous coagulum plug discharged during the feeding periods was cut to coagulum fragments of 10×10×10 mm and was filled into moulds of 290×120×218 mm. The moulds were turned upside-down after 10, 20 and 30 minutes. The cheese was left in the moulds during 20 hours at room temperature. Then each cheese was divided into 8 pieces and packed under addition of 4.5 kg salt solution of 15° Bé per 15.8 kg cheese. The cheese was stored in two weeks at 5° C. The cheese so obtained contained 57.3% water, 17% fat and had a pH of 4.89. The cheese exhibited a typical structure and taste of traditional Feta cheese.

We claim:

1. A process for the production of cheese curd which comprises subjecting a liquid milk product to renneting by adding thereto and admixing therewith a coagulating agent, introducing the resulting mixture into the inlet end of a long coagulator tube while said mixture is at a coagulating temperature in the range of about 25°–50° C., passing said mixture under substantially adiabatic conditions through the coagulator tube, discharging said mixture as plug-shaped coagulated cheese curd from an outlet end of said tube, the renneting conditions being selected so that the renneting time remaining after said introduction of the mixture into said inlet end is at least three minutes, said mixture being fed intermittently into said inlet end during feeding periods alternating with intermediate stand still periods, the length of a feeding period being selected so that no substantial coagulation occurs in the mixture from its introduction into the coagulator tube to its first stand still period in said tube, the length of a stand still period being sufficient so that the mixture, upon being subjected to only one stand still period in said tube, forms a coagulum firm enough to be moved as a continuous plug toward said outlet end by said feeding of mixture into said inlet end during a successive feeding period, the speed of feeding mixture into said tube and the length of said tube being adjusted so that the residence time in said tube for the cheese curd discharged from said outlet end comprises at least one feeding period and one stand still period.

2. A process according to claim 1, in which said speed of introduction and the length of the coagulator tube are selected so that the residence time of the mixture in the coagulator comprises at least two feeding periods and two stand still periods.

3. A process according to claims 1 or 2 in which said feeding period is 0.5–1.2 times the renneting time.

4. A process according to claim 1, in which the total length of one feeding period and one stand still period is at least 1.5 times the renneting time.

5. A process according to claim 1, in which said speed of introduction and the length of the coagulator tube is adjusted so that the total residence time of the mixture in the coagulator tube is an integer multiple of said feeding period.

6. A process according to claim 1, in which the milk product is transported into the coagulator tube during the feeding periods at a velocity of 4–20 m/min.

7. The process of claim 1, in which the mixture is introduced into the coagulated tube with a gradually increasing feed rate during an introductory phase of each feeding period.

8. The process of claim 1, comprising also maintaining the tube walls free of vibration while passing said mixture through the tube.

9. The process of claim 1, in which said coagulator tube has a length to diameter ratio exceeding 500.

10. The process of claim 9, in which said length/diameter ratio exceeds 1,000.

11. The process of claim 10, in which the coagulator tube has an internal diameter of 5–15 centimeters.

* * * * *